United States Patent
Mangin (10) Patent No.: US 10,218,631 B2
(45) Date of Patent: Feb. 26, 2019

(54) METHOD FOR TRAFFIC SHAPING OF DATA FRAMES IN NETWORK AND DEVICE AND COMPUTER PROGRAM PRODUCT THEREFOR

(71) Applicant: MITSUBISHI ELECTRIC CORPORATION, Tokyo (JP)

(72) Inventor: Christophe Mangin, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/523,154

(22) PCT Filed: Jan. 12, 2016

(86) PCT No.: PCT/JP2016/000114
§ 371 (c)(1),
(2) Date: Apr. 28, 2017

(87) PCT Pub. No.: WO2016/129205
PCT Pub. Date: Aug. 18, 2016

(65) Prior Publication Data
US 2017/0331748 A1 Nov. 16, 2017

(30) Foreign Application Priority Data

Feb. 13, 2015 (EP) .................................... 15305221

(51) Int. Cl.
*H04L 12/805* (2013.01)
*H04L 12/815* (2013.01)
(Continued)

(52) U.S. Cl.
CPC ............ *H04L 47/365* (2013.01); *H04L 47/22* (2013.01); *H04L 47/621* (2013.01);
(Continued)

(58) Field of Classification Search
CPC ....... H04L 47/10; H04L 47/22; H04L 47/365; H04L 47/621
See application file for complete search history.

(56) References Cited

U.S. PATENT DOCUMENTS

2003/0050954 A1* 3/2003 Tayyar ................ H04L 47/2441
718/102
2004/0202191 A1 10/2004 Vrabel
(Continued)

FOREIGN PATENT DOCUMENTS

| JP | 2002-16637 A | 1/2002 |
| TW | 201234839 A1 | 8/2012 |
| WO | WO 2012/097006 A1 | 7/2012 |

OTHER PUBLICATIONS

"802.3 Call for Interest (CFI) Frame Preemption", MAC Services in support of Frame Preemption, IEEE 802.3 Plenary, Mar. 11-16, 2012.
(Continued)

*Primary Examiner* — Kevin C. Harper
(74) *Attorney, Agent, or Firm* — Birch, Stewart, Kolasch & Birch, LLP (57) ABSTRACT

The present invention relates to packet-switched networks, such as Ethernet, and more particularly to a method for traffic shaping of data frames to transmit in such a telecommunication network, the frames to transmit being distinguished between: express frames, needing to be sent within predetermined time windows, and normal frames, intended to be sent at times outside said time windows. More particularly, for a current normal frame, the method comprises the steps of: determining whether said normal frame can be fragmented, and if yes: determining whether a remaining time to a next time window opening is enough to transmit one or several fragments of said normal frame, and if yes: transmitting said one or several fragments.

15 Claims, 8 Drawing Sheets

(51) Int. Cl.
H04L 12/863 (2013.01)
H04Q 11/04 (2006.01)
H04L 12/865 (2013.01)
H04L 12/911 (2013.01)

(52) U.S. Cl.
CPC ........ H04L 47/6275 (2013.01); H04L 47/826 (2013.01); H04Q 11/04 (2013.01)

(56) References Cited

U.S. PATENT DOCUMENTS

| | | | |
|---|---|---|---|
| 2008/0112318 A1 | 5/2008 | Groleau et al. | |
| 2008/0112371 A1* | 5/2008 | Joshi | H04L 12/66 370/337 |
| 2015/0078395 A1* | 3/2015 | Nishimura | H04L 47/629 370/412 |

OTHER PUBLICATIONS

"Bridges and Bridged Networks-Amendment: Enhancements for Scheduled Traffic", Draft Standard for Local and Metropolitan Area Networks-, IEEE P802.1Qbv/D2.1, Oct. 24, 2014, pp. 1-48.

"Draft Standard for Ethernet Amendment: Specification and Management Parameters for Interspersing Express Traffic", IEEE Draft P802.3br/D1.0, Dec. 24, 2014, pp. 1-48.

Imtiaz et al., "Approaches to reduce the Latency for High Priority Traffic in IEEE 802.1 AVB Networks", 2012 IEEE, pp. 161-164.

Mikolášek et al., "Segmentation of Standard Ethernet Messages in the Time-Triggered Ethernet", 2008 IEEE, pp. 392-399.

Tămaş-Selicean et al., "Optimization of TTEthernet Networks to Support Best-Effort Traffic", 2014 IEEE Emerging Technology and Factory Automation (ETFA), pp. 1-4.

* cited by examiner

METHOD FOR TRAFFIC SHAPING OF DATA FRAMES IN NETWORK AND DEVICE AND COMPUTER PROGRAM PRODUCT THEREFOR

TECHNICAL FIELD

The present invention relates to packet-switched networks, such as Ethernet.

BACKGROUND ART

Such networks are more and more used in domains other than data communications.

Industrial networks are currently an example of this application (e.g. Profinet standard, IEC standards on redundancy: HSR, PRP, MRP).

The evolution introduced by these technologies mainly focuses on the improvement of the resilience of these networks: protection against single failure without affecting the data transmission.

However, other constraints such as the enforcement of strict temporal properties of the data transmission cannot be implemented using standard Ethernet. More particularly, the transmission of control/command messages that requires tightly bounded latency and/or jitter is not properly addressed.

Several solutions have been developed and standardized in the transportation field, mainly in aeronautics: the Avionics Full-Duplex Switched Ethernet (AFDX, protocol ARINC 664 Part 7) and the technology TTEthernet (SAE AS6802). Both solutions rely on the addition of timing properties to the organization of the packet multiplex.

Figure 1:
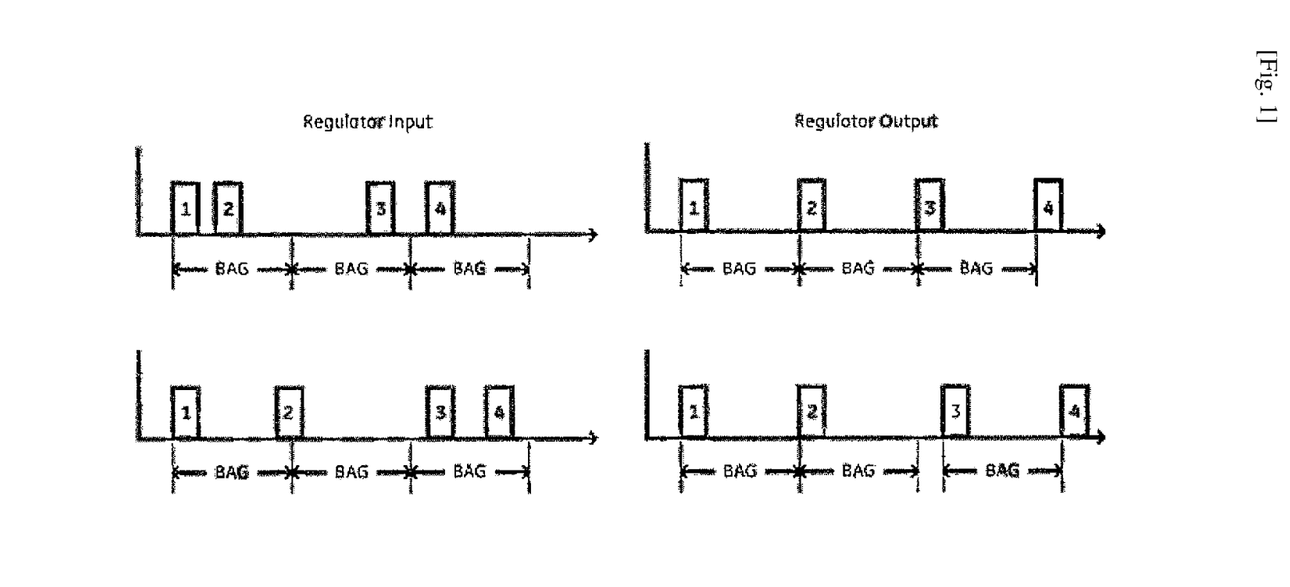
FIG. 1 shows two examples of an AFDX traffic shaping according to the BAG.

As for an example, AFDX defines a Bandwidth Allocation Gap (BAG), which fixes the maximum and guaranteed rate that data of a given flow can be sent at: the BAG sets the volume of data that a flow can transmit within a fixed time interval, as it can be seen on FIG. 1 which shows two examples of an AFDX traffic shaping according to the BAG. When setting the BAG rate for each flow, care is taken so as to provide enough bandwidth for other flows and the total bitrate cannot exceed the link capacity. The shaping according to the BAG is performed only in the sources and the multiplexing is then performed asynchronously in the downstream nodes. This technique does not provide tight bounds on jitter and transfer delays.

As for a second example, TTEthernet is based on a tight synchronization of the network nodes, and defines three types of traffic: Time-triggered (TT), Rate-constrained (RC) and Best-effort (BE).

TT messages are sent over the network according to a predefined static schedule that leverages the domain-wide synchronized clock. They take precedence over all other message types. The schedule defines a set of TT windows for each switch output port, in which TT frames are transmitted. Occurrence, temporal delay and precision of time-triggered messages are predefined and guaranteed.

RC messages are used for applications with less stringent determinism and real-time requirements. TT windows and a wide domain synchronised clock are used as inputs for the shaping algorithm that controls the RC traffic. The algorithm checks whether each frame transmission can be finished before the next TT window starts. If no frame fits, the transmitter remains idle until the transmission of the next scheduled TT frame begins. This idle time (called "guard band") guarantees that RC frames (and BE frames also, as explained below) never interfere with TT frames. These messages guarantee that bandwidth is predefined for each application and delays and temporal deviations have bounded limits.

BE messages follow the usual Ethernet policy and are transmitted in the remaining TT windows, using the interference avoidance mechanism described above. There is no guarantee whether and when these messages can be transmitted, what delays occur and if messages arrive at the recipient.

Figure 2:
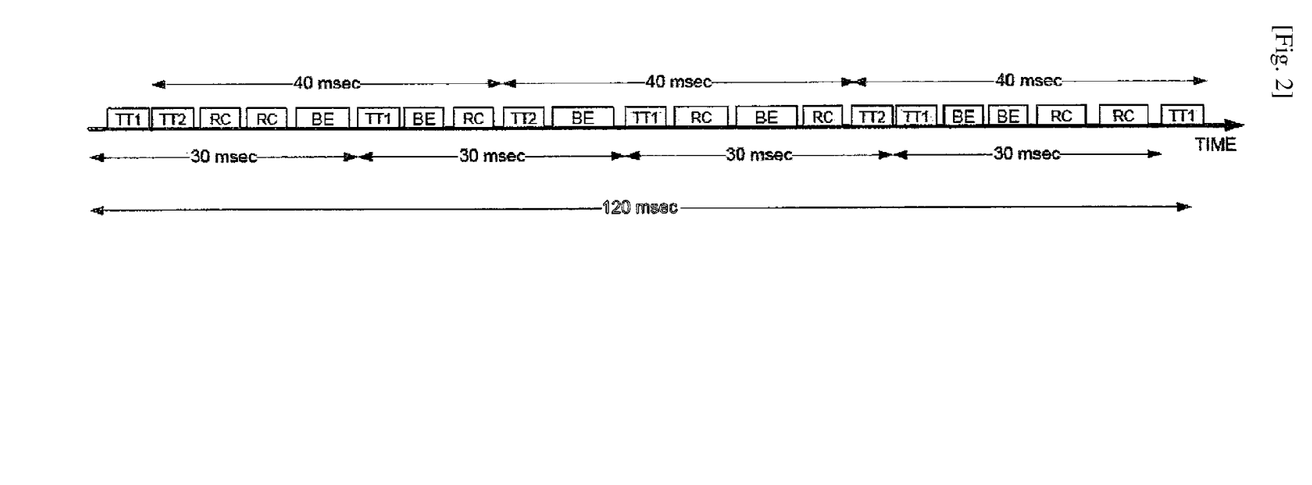
FIG. 2 shows a TTEthernet flow scheduling.

These three types of traffics are allocated with time slots according to a TDMA (Time Division Multiple Access) scheme that organizes the transmission multiplex in recurrent cycles subdivided into sub-cycles (base periods), as it can be seen on FIG. 2 which shows a TTEthernet flow scheduling. The time slots allocated to each traffic type correspond to a volume of data per base period and their (time) position is fixed over the whole network.

Packets are relayed according to a communication schedule defined a priori. Hence, as the local clocks are synchronized, the communication schedule is executed synchronously and contentions at the network are avoided. Time-triggered communication provides therefore strong temporal partitioning because the possibility that two or more communication participants access the network at the same point in time can be excluded by design.

In an effort to provide a framework for the support of TT traffics over standard Ethernet-based networks, the IEEE (802.1 TSN Work Group) is currently standardizing a transmission selection mechanism called "Time Aware Scheduler". This specification is the object of an amendment of the 802.1Q standard which is called "802.1Qbv—Enhancements for Scheduled Traffic". This transmission selection mechanism relies on transmission gates that are associated with each traffic class queue: a frame on a traffic class queue is not available for transmission if the transmission gate is in the closed state or if there is insufficient time available to transmit the entirety of that frame before the next gate-close event associated with that queue. A per-traffic class queue "queueMaxSDU" parameter defines the maximum service data unit size for each queue. Frames that exceed the maximum size for the queue are discarded.

Figure 3:
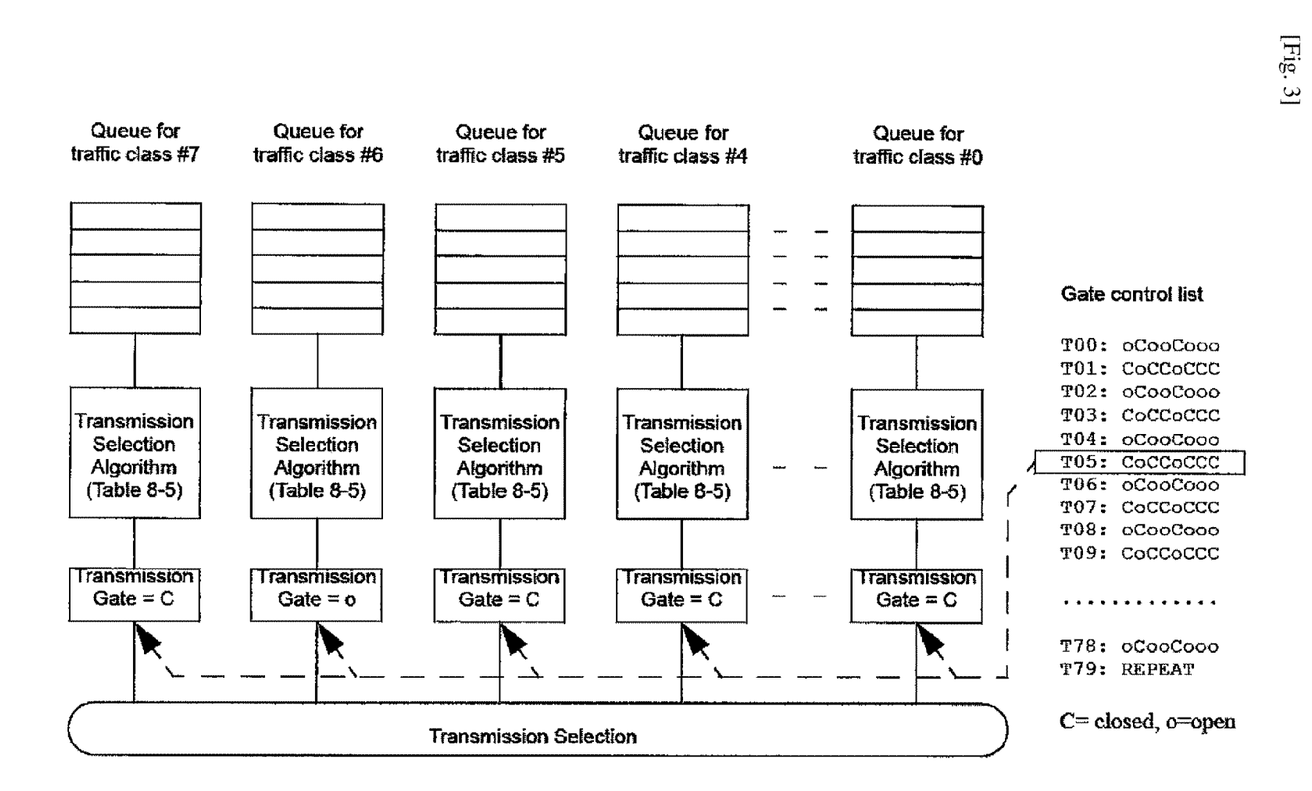
FIG. 3 shows the principle of a transmission selection according to IEEE 802.1Qbv.

A gate control list associated with each Port changes the transmission gate state for the gate associated with each Port's traffic class queues (#7, #6, . . . , #0—FIG. 3). In an implementation that does not support enhancements for scheduled traffic, all gates are assumed to be permanently in the open state. A state machine is in charge of controlling the transitions of the per-queue gate states as it can be seen on FIG. 3 which shows the principle of a transmission selection according to IEEE 802.1Qbv.

However, the introduction of a fixed schedule for the organization of the multiplex induces some unfairness in the access to the medium: frames of RC and BE flows can be inserted only in time slots long enough to include a whole frame, which length is nevertheless variable. This leads to additional (not always necessary) delay and jitter in the transmission of RC frames as well as waste of bandwidth on the link.

To solve this issue, IEEE 802.3br (amendment to 802.3: "Specification and Management Parameters for Interspersing Express Traffic") defines a preemption mechanism of so-called "Normal-Frames" (frames with lower priority, typically RC and BE frames) that guarantees that no conflicts occurs when so-called "Express-Frames" (frames with guaranteed low latency, typically TT frames) are scheduled for transmission and resulting in no added latency for Express traffic.

Figure 4:
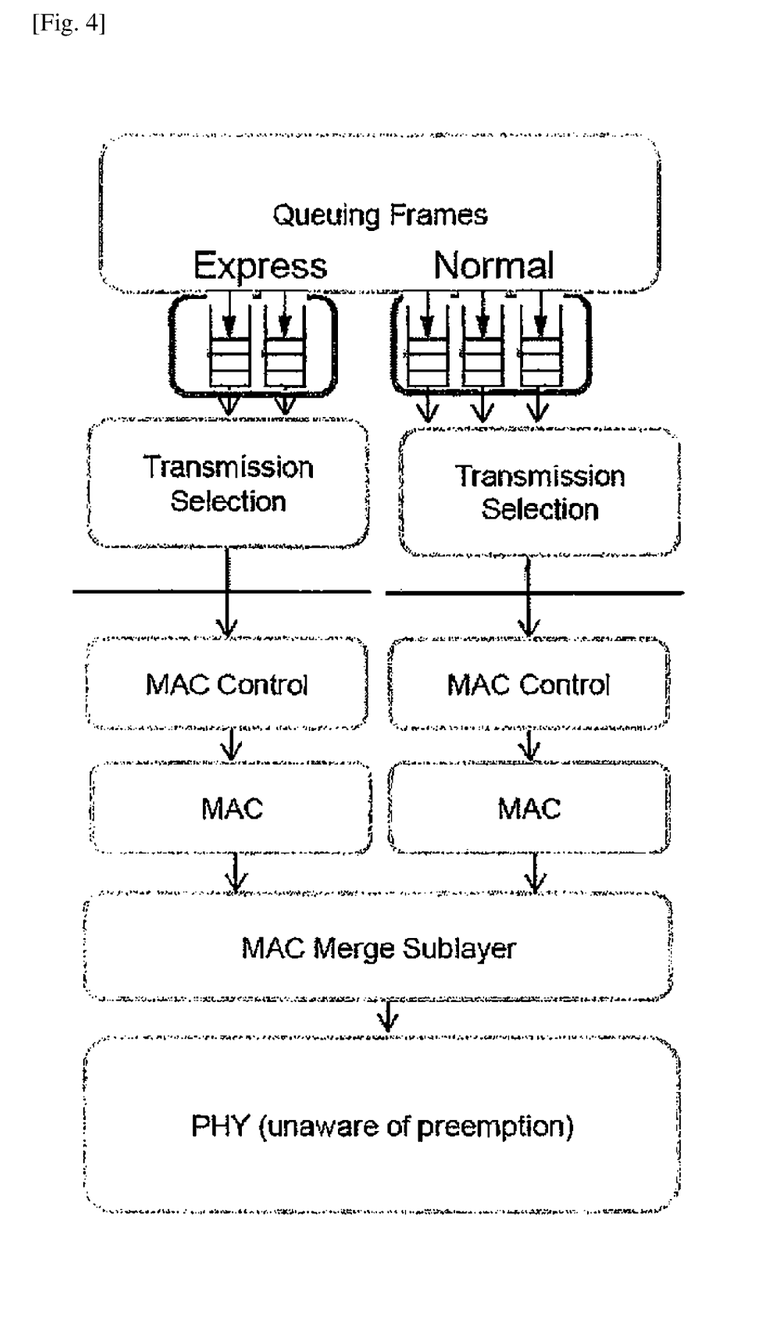
FIG. 4 shows Express and Normal traffics data paths.

This mechanism allows a MAC Client that has a schedule for Express traffic to preempt Normal-Frames before the scheduled Express traffic arrives (as it can be seen on FIG. 4 which shows Express and Normal traffics data paths). When a scheduled frame arrives, it can be transmitted immediately.

Figure 5:
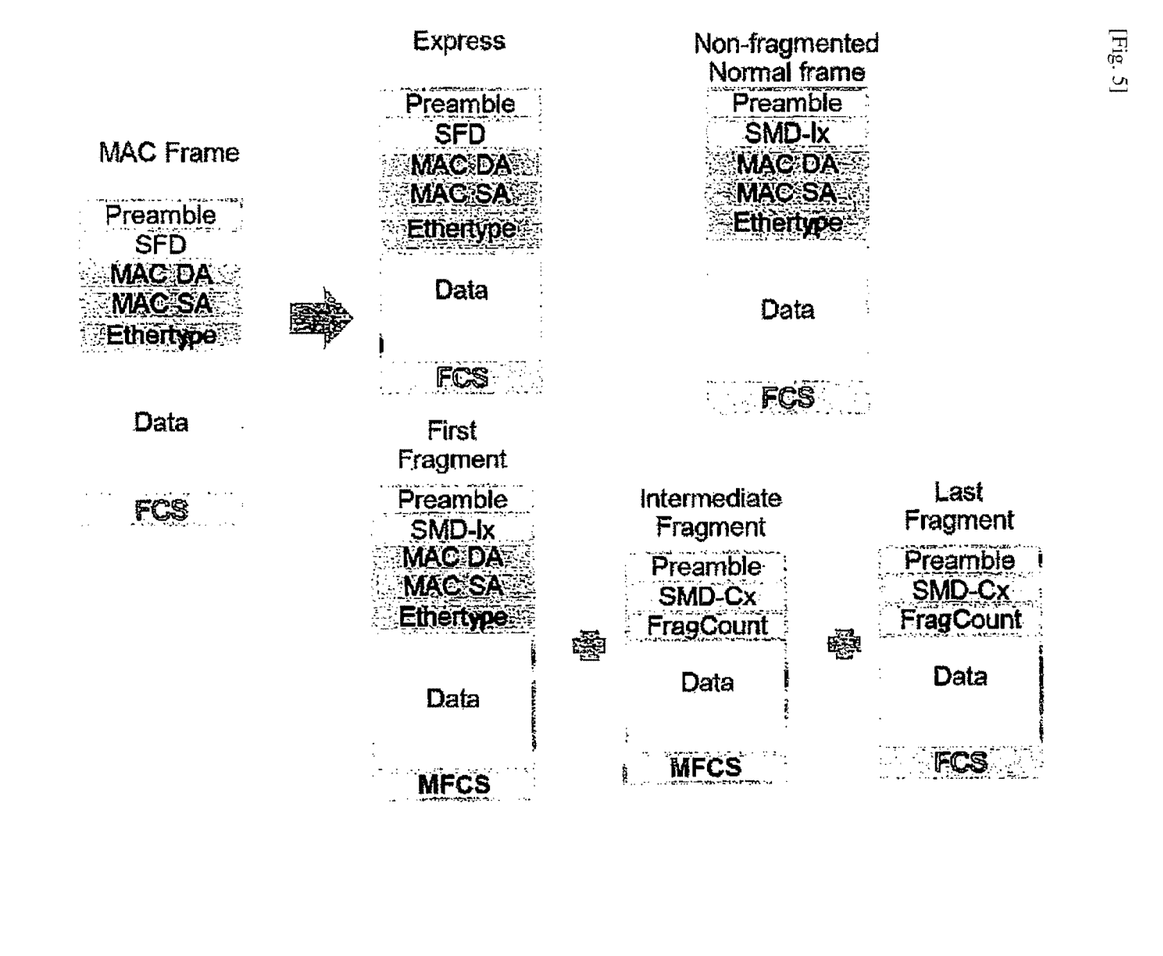
FIG. 5 shows non-fragmented Express and Normal Frames, and successive fragments of a Normal Frame (lower part)

In addition, the 802.3br specification defines a per-hop fragmentation and reassembly scheme that allows stopping the transmission of a Normal-Frame to give a transmission opportunity to an Express-Frame. Normal-Frame fragments and Express-Frames are distinguished by their preamble length and a so-called "Start Frame Delimiter" (SFD) field as shown in FIG. 5 which is related to IEE 802.3br frame and fragment formats. This allows non-express frames (Normal-Frames) not to wait for a long enough timeslot to be transmitted, resulting in a limited added latency for Normal flows and a better use of the link capacity.

It is to be noted that only a single Normal-Frame can be fragmented at any time, i.e. a frame which transmission time span covers one or several TT windows. In FIG. 5, MFCS is the CRC (Cyclic Redundancy Check) of a non-final fragment. Here, its value is the same as the FCS (Frame Check Sequence) of the frame octets transmitted XOR FFFF0000. SMD-Ix indicates the beginning of a Normal-Frame, such as a first fragment of that frame (an initial fragment), while SMD-Cx indicates a non-initial fragment of that frame. For completeness of the explanations, MAC DA and MAC SA are respectively the destination and source MAC addresses. "Ethertype" means Ethernet type length filed. The upper part of FIG. 5 shows then no fragmented Express and Normal Frames, and its lower part shows successive fragments of a Normal Frame.

The minimum preempted fragment size is 64 bytes. Therefore a packet with a length less than 128 bytes cannot be preempted. Non-final fragments have a length multiple of 8 bytes.

However, the multiplexing mechanism described above does not guarantee:
a fair access to the medium to Normal-frames relatively to Express-frames,
a fair access to the medium to Normal-frames belonging to a given flow relative to other Normal flows,
that Normal-frames or fragments can be inserted in the multiplex during their allocated time slots according to IEEE 802.1Qbv,
that Normal-frames can be fragmented according to IEEE 802.3br.

SUMMARY OF INVENTION

The present invention aims to improve the situation.

To that end, it is proposed first a method for traffic shaping of data frames to transmit in a telecommunication network, the frames to transmit being distinguished between:
express frames, needing to be sent within predetermined time windows,
and normal frames, intended to be sent at times outside said time windows (step b) of FIG. 9 commented below), More particularly, for a current normal frame, the method comprises the steps of: determining whether said normal frame can be fragmented (step c) of FIG. 9), and if yes:
determining whether a remaining time to a next time window opening is enough to transmit one or several fragments of said normal frame, and if yes:
transmitting said one or several fragments.

Figure 9:
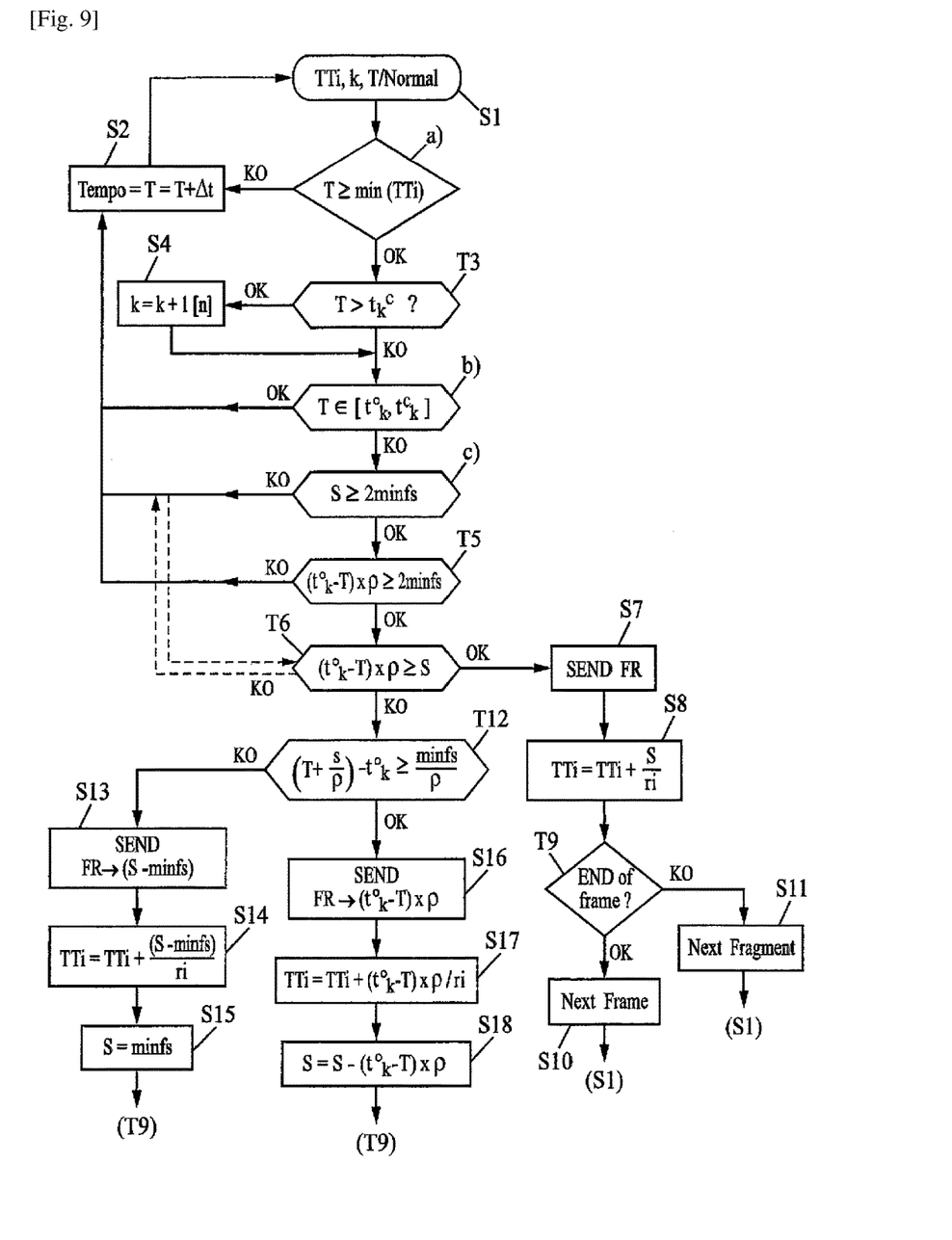
FIG. 9 shows steps of a method according to an example of embodiment of the invention.

In a particular embodiment, the aforesaid normal frames and, if any, one or several fragments remaining from a previous normal frame processing, are queued in a memory and are assigned with respective processing instants and a current time is compared (step a) of FIG. 9) with a least processing instant so as to implement said steps if the current time is greater than the least processing instant.

In a more particular embodiment of the invention where several flows of frames are being processed together, each flow comprises successive normal frames and, if any, one or several fragments remaining from a previous normal frame processing. These normal frames and/or fragments of each flow are respectively queued in a memory and are assigned with respective processing instants. Then, a current time is compared (step a) of FIG. 9) with a least processing instant among all the queues of the respective flows so as to implement the steps of the method if the current time is greater than said least processing instant.

In a particular embodiment, if said current normal frame cannot be fragmented, then it is determined whether a remaining time to a next time window opening is enough to transmit the whole current normal frame, and:
if yes, said whole current normal frame is transmitted,
otherwise, a temporization step is applied until a next current time.

In a particular embodiment, if said current normal frame can be fragmented, then it is determined whether a remaining time to a next time window opening is enough to transmit at least one fragment, and:
if yes, at least one fragment is transmitted,
otherwise, a temporization step is applied until a next current time.

More particularly, if the current normal frame can be fragmented, then it is determined further whether the remaining time until the next window opening is enough to send a remaining part of a normal complete frame, and:
if yes, corresponding fragments of a remaining part of said normal complete frame are transmitted,
otherwise, one or several fragments, corresponding to a total duration less than the remaining time until the next window opening, are transmitted.

In a particular embodiment, the aforesaid remaining time until the next window opening is compared to a time taken for transmitting a fragment or a whole normal frame, said taken time being estimated on the basis of a capacity of a link on which said fragment or frame is transmitted.

Moreover, the aforesaid processing instants (assigned to the queued frames and/or fragments) are preferably updated at each scheduled transmission of a frame or a fragment, by the duration of that scheduled transmission estimated on the basis of a transmission flow bitrate.

In an embodiment, a normal frame is considered as able to be fragmented if its total length is at least twice as a length of a minimum fragment size.

Preferably, that total length of a normal frame is updated with its remaining fragments which have not been transmitted (such frame length updating steps are labelled S15 and S18 on FIG. 9).

Figure 8:
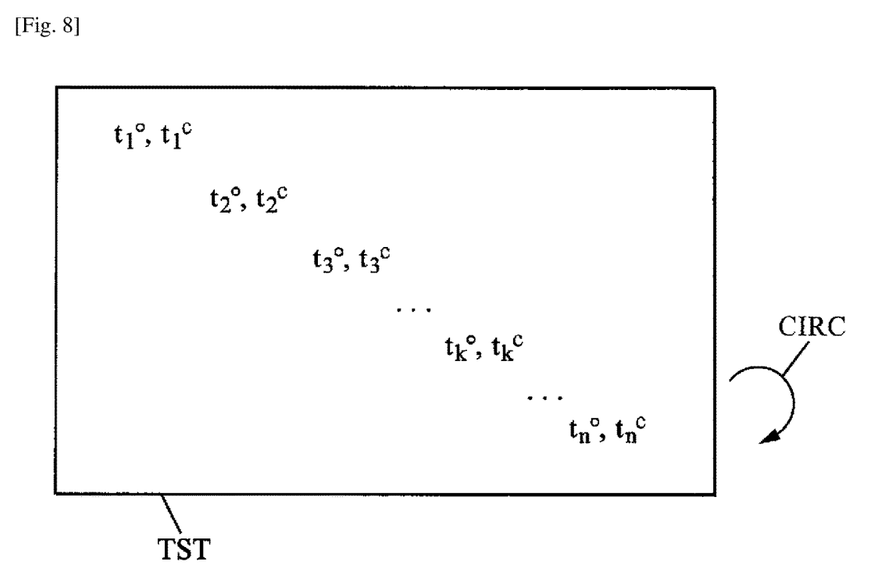
FIG. 8 shows an example of a cyclic timetable defining the aforesaid time windows.

In an embodiment, the aforesaid time windows are successively defined in a cyclic timetable (as shown in the example of embodiment of FIG. 8).

The present invention aims also at a device, having traffic shaping means (such as a processor and at least one memory) for performing the method according to the invention.

The present invention aims also at a computer program product, comprising instructions for performing the method of the invention, when run by a processor.

The present invention is illustrated by way of example, and not by way of limitation, in the figures of the accompanying drawings, in which like reference numerals refer to similar elements.

DESCRIPTION OF EMBODIMENTS

In the present following specification, "Express traffic" (or "express frame") denotes low latency, scheduled or TT ("Time-triggered") traffic (or frame), while "Normal traffic" (or "normal frame") denotes Rate-constrained (RC) traffic, or Best-effort (BE) traffic, or any other non-Express traffic (or frame).

The present invention proposes a combined frame scheduling and fragmentation mechanism which makes it possible to guarantee the conditions listed above.

Figure 6:
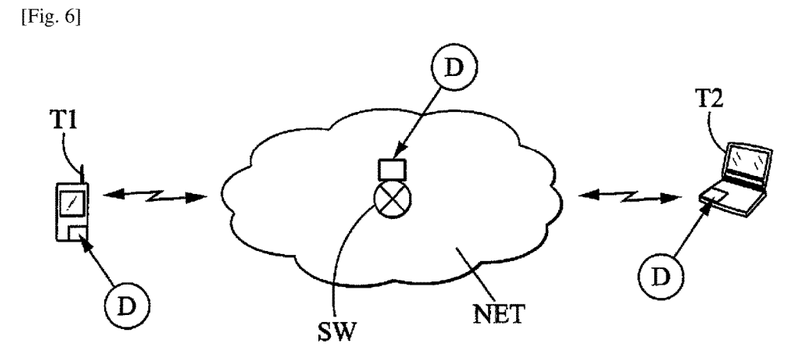
FIG. 6 shows a system comprising elements which can include a device according to the invention.

Referring to FIG. 6, the scheduling function can be located in a device D provided for each output port of a switch SW of a network NET, or also in a device D having a frame transmission function in a terminal station (T1, T2) for transmitting data or voice data from a terminal T1, T2. As shown on FIG. 7, the incoming frames of each flow (F1, . . . , Fi, . . . , Fm) which are received through an input interface IN of the device D are stored in FIFO order ("First In First Out") in an independent queue ($Q_i$ for flow i), in a working memory MEMA. The device D further comprises a processor PROC for performing the method of the invention with synchronization clock data CLK (obtained from the network or from a synchronized internal clock). Furthermore, the device D comprises a memory MEMB (which can be in a same or in a different memory unit from the working memory MEMA) storing the time table TST detailed on FIG. 8 for allocating timeslots to frames or fragments (FR) to be transmitted. Finally, the frames or fragments (referenced FR in FIG. 7) to transmit are received in an output interface OUT of the device in a convenient order, thanks to the implementation of the invention as detailed below with reference to FIG. 9. Of course, the device D can have further a third memory MEMC (in a same or a different memory unit from MEMA and MEMB) for storing computer program code instructions (INST) to be run by the processor PROC so as to implement the method of the invention.

The device D can be implemented as an autonomous device, such as an independent chip of a terminal T1, T2 or of a switch SW, or alternatively can use hardware resources (such as the processor and/or a memory unit) of such a terminal or switch (or more widely, any element of a network).

Referring to FIG. 8, the time table TST is used as follows.

Time is expressed in a unit corresponding to the duration of 1 bit on the transmission link attached to the output port. All nodes in the network are preferably synchronised on the same clock and have the same image of the current time CLK. The current value of the time is denoted hereafter as T.

It is associated a bit-rate, denoted $r_i$, with each flow i, whether it is Normal or Express:

The volume of data transmitted in the recurring transmission windows of an Express flow allows defining the bit-rate of that flow, Normal flows can be allocated with a bit-rate (maximum, enforced or not).

The sum of all bitrates $r_i$ must not be greater than the total capacity of the link. For the sake of simplification, all links have preferably (but optionally) the same capacity, denoted $\rho$ hereafter.

The transmissions of frames of each Express flow follow a periodic pattern. The table TST (of finite length) can contain the succession of all successive transmission window opening and closing times (respectively $t^o_k$ and $t^c_k$) of all the scheduled Express flows. This means that an Express frame or fragment is transmitted within a time interval [$t^o_k$, $t^c_k$] while a Normal frame or fragment is rather transmitted in a left time interval [$t^c_k$, $t^o_{k+1}$] (with k modulo n). The assumption is also made that the duration of each widow is pre-computed so that, when opened, the window can permit the transmission of the Express-frames for which it has been provided. All Express window opening and closing times are stored in the circular table TST (with k[n] shown by the circular arrow CIRC on FIG. 8). In practice, each entry of the table is a couple ($t^o_k$, $t^c_k$) which respectively represents the opening time and the closing time of a window k. An offset corresponding to the depth of the table is added to the entry at each time when a read pointer of the table rewinds back to the first element of the table. The read pointer takes into account the current value of time T.

As for Normal flows, each normal frame stored at the head of each flow queue is associated with a theoretical transmission time ($TT_i$), which corresponds to the theoretical time the first bit of the frame is supposed to be transmitted at. $TT_i$ are sorted in increasing order and the Normal frame or fragment with the least $TT_i$ (referenced min(TTi) in FIG. 9) is the next Normal frame or fragment candidate for insertion on the multiplex.

With reference now to FIG. 9:

S is the size of the current Normal-frame or fragment to be transmitted, minfs is the minimum fragment size as defined by IEEE 802.3br ("minFrag" according to the notation of that value in that specification), $r_i$ is the bitrate of flow i, $\rho$ is a mean capacity (in the example described here) of a link, $\Delta t$ is a time increment during a temporisation step S2 (for example the duration of a one bit transmission), $TT_i$ are the theoretical time the first bit of a frame or fragment FR in a queue $Q_i$ is supposed to be transmitted at, before the computation according to the method of the invention.

A Normal-frame or fragment is inserted on the multiplex (actually transmitted) at least if the following conditions are met:

a) T≥min($TT_i$) (arrow "OK" from test a) on FIG. 9) and
b) T is not comprised in the current ($t°_k$, $t^c_k$) window (arrow "KO" from test b) on FIG. 9) and
c) S≥2*minfs (arrow "OK" from test c) on FIG. 9).
The "KO" denotes "NO".

Condition a) means that the current time T has come to start considering normal frames.

If condition a) is systematically verified, the system guarantees that each Normal flow is not transmitted at a rate greater than $r_i$. It should be noted that condition a) can be made optional if fairness only between RC flows is to be achieved relatively to a weight represented by their respective bit-rate $r_i$.

Condition b) means that it is checked whether the current time T is within a time window k (e.g. between its opening time $t°_k$, and its closing time $t^c_k$) so as to give priority to the transmission of an Express frame in that case.

Condition c) means that it is checked whether (if the conditions a) and b) above are achieved) that a Normal frame can be fragmented of not. If it cannot be fragmented (arrow KO at the output of test c)), then a temporisation step S2 is performed until the time duration [$t^c_k$, $t°_{k+1}$] (with k [n], meaning "k modulo n") is long enough to send this non fragmentable Normal frame. If the Normal frame can be fragmented (arrow OK at the output of test c)), then further tests and steps are implemented as detailed below so as to perform the fragmentation in good and fair conditions.

The process starts with a first step S1, of:
Considering Normal frames or fragments to transmit (the algorithm points to a routine dedicated to Normal frames and fragments to process for transmission—for sending a whole frame or a fragment, common steps of the routine are used for algorithmic optimization),
Then, calculating the $TT_i$ in each queue,
Referring to the table TST so as to determine the current time window having the current index k,
Referring to the clock so as to determine the current time value T.

Then, step a) is performed: if current T has come for sending a Normal frame or fragment, then it is verified whether, considering the current window index k, the current time falls after the closing of that time window (arrow OK from test T3), meaning then that the window index k needs to be updated (increment of step S4, with k [n]). Then, step b) is performed so as to determine whether priority is to be given to Express frames. Otherwise (arrow KO from test b)), it is determined whether the Normal frame can be fragmented. If not (arrow KO from test c)), then test T6 can be performed with the information that the frame cannot be fragmented (dashed arrow line KO from test c)). In test T6, it is determined whether a whole and complete frame can be transmitted, while taking into account the remaining time T to the next window opening $t°_k$, and the link capacity ρ. If yes (arrow OK from test T6), then the frame FR is sent at step S7. The next time scheduled $TT_i$ for sending the next frame (or fragment as it will be seen later) is updated at step S8, while taking into account the flow bit-rate $r_i$ for sending a new frame having a size S. A test T9 is further performed so as to read the latest fragment—typically its heading—to be transmitted at step S7, to determine whether that fragment was the end of a frame. In the present branch of following the algorithm, since a complete frame is sent at step S7, the output of test T9 should be "OK" and a next candidate frame is considered (step S10) to be processed referring back to step S1.

If a whole and complete frame cannot be transmitted according to the test T6 (dashed arrow line KO from test T6, with the information that the frame cannot be fragmented), then a temporisation step is performed in step S2, so as to wait for a new time interval [$t^c_k$, $t°_{k+1}$] long enough to send the whole frame.

If the frame can be fragmented (arrow OK from step c)), then fragmentation is contemplated and in test T5 it is checked whether the time left until the next window opening is long enough to send a fragment having a duration minfs. If yes (arrow OK from test T5), it is checked further whether a whole frame can be sent (at test T6, explained above). If fragments only can be sent (arrow KO from test T6 with the information that the frame can be fragmented), it is checked, at test T12, whether the remaining time until the next window opening is sufficient to send a remaining part of a complete frame (arrow "KO" of test T12 which condition can be written also: ($t°_k$−T) ρ≥S−minfs: meaning then that at least one fragment (complementary for building the complete frame) having a length S−minfs can be created and sent at step S13 without disturbing the next transmission frame or fragment). Then, the scheduled times $TT_i$ are updated accordingly at step S14, and so as the next frame length to consider at step S15. Then, it can be checked whether that fragment is an end of frame (test T9). Normally, it should. It is nevertheless preferred to check it in the shown example because a last step (not shown on FIG. 9) can consist on calculating the FCS (Frame Check Sequence) to add at the end of the frame to transmit.

If ($t°_k$−T)ρ≤S−minfs (arrow OK from test T12 while ($t°_k$−T)*ρ≥minfs in test T5), this means that at least one fragment can be created and sent at step S16 (but not a last fragment terminating a frame). The length of the fragment is given by ($t°_k$−T)*ρ in step S16. Then, the scheduled times $TT_i$ are updated accordingly at step S17, and so as the next frame length to consider at step S18. Then, it can be checked whether that fragment is an end of frame (test T9). Here, it can or cannot. If not (arrow KO from test T9), then a next fragment is considered in step S11 to implement with it step S1 again.

It should be noted that when step S1 is implemented again, the respective times TTi in the queues Q1, . . . , Qm (of the different flows F1, . . . , Fm) have been updated in one of the steps S8, S14 and S17, and the current time T has also advanced during the transmission of the fragment or the frame in one of steps S7, S13, S16. Therefore, these parameters TTi and T are naturally updated and ready to be used at step S1 (with a current window index k which can be updated also at step S4).

The main steps of the algorithm shown on FIG. 9 are listed below:

a) If T ≥ min($TT_i$) and
b) If T is not comprised in the current ($t°_k$, $t^c_k$) window and
c) If S ≥ 2* minfs,
If ($t°_k$− T)* ρ ≥ minfs
If ($t°_k$− T)* ρ ≥ S
Send frame or final fragment
$TT_i$ = $TT_i$ + (S/$r_i$)
Select next frame of fragment candidate for transmission
Else
If (T+ S/ρ) − $t°_k$ >= minfs/ ρ
Create and send fragment of length ($t°_k$ − T)* ρ
$TT_i$ = $TT_i$ + (($t°_k$ − T)* ρ/$r_i$)
S = S − ($t°_k$ − T)* ρ
Select next fragment or frame candidate for transmission
Else
Create and send fragment of length (S − minfs)

-continued

```
TT_i = TT_i + ((S − minfs)/r_i)
S = minfs
Select next fragment or frame candidate for transmission
Endif
Endif
Endif
Else
If (T+ S/ρ) < t°_k
Send frame or final fragment
TT_i = TT_i + (S/r_i)
Select next frame or fragment candidate for transmission
Endif
Endif
```

The invention can be applied to any domain where a workload (computing time, process scheduling, etc.) has to be shared in time. In those cases, no particular change is to be made.

The invention can apply in networks supporting mix of applications with various time constraints (ranging from strong real-time (e.g. critical control loops) to more relaxed latency and synchronisation (audio-video transport) and best-effort).

The present invention can be implemented for example in time sensitive control networks (or any network such as in factory automation, or automotive or utilities or trains).

This invention solves a standard implementation problem but can be used as support for the standardisation any other "transmission selection" mechanism within IEEE 802.1 TSN, providing then a network traffic shaping with ultra-low latency and a network load sharing optimisation.

Figure 7:
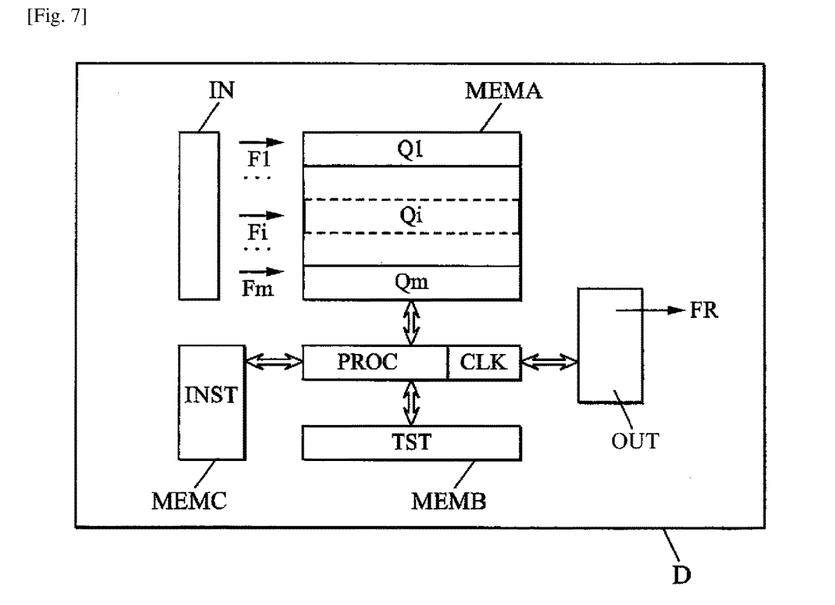
FIG. 7 shows an example of a structure of a device according to the invention, and comprising traffic shaping means so as to perform the method according to the invention.

It has been described above in details the processing of several flows in parallel queues (Q1, . . . , Qm) like shown on FIG. 7. However, the invention can be performed also with a single queue of one single flow. Then, each frame or fragment of the queue has a processing time TTi which can be updated and rearranged at each implementation of the steps shown on FIG. 9 so as to determine which fragment or frame is to process at a next implementation of those steps.

The present invention can be embedded in a computer program product, which comprises all the features enabling the implementation of the methods described herein, and which, when loaded in an information processing system (for example a user equipment or a network element), causes the information processing system to carry out the invention. Computer program means or computer program in the present context mean any expression, in any language, code or notation, of a set of instructions intended to cause a system having an information processing capability to perform a particular function either directly or after the conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

INDUSTRIAL APPLICABILITY

This invention is applicable to networks in many kinds of fields.

The invention claimed is:

1. A method for traffic shaping of data frames to transmit in a telecommunication network, the frames to transmit being distinguished between:
   express frames, needing to be sent within predetermined time windows,
   and normal frames, intended to be sent at times outside said time windows,
   wherein, for a current normal frame, the method comprises the steps of:
   determining whether said normal frame can be fragmented, and if yes:
   determining whether a remaining time to a next time window opening is enough to transmit one or several fragments of said normal frame, and if yes:
   transmitting said one or several fragments,
   and wherein:
   several flows are being processed and each flow comprises successive normal frames and, if any, one or several fragments remaining from a previous normal frame processing,
   said normal frames and/or fragments of each flow are queued in a memory and are assigned with respective processing instants,
   a current time is compared with a least processing instant among all the queues of the respective flows so as to implement said steps if the current time is greater than said least processing instant,
   said processing instants are updated at each scheduled transmission of a frame or a fragment, by the duration of said scheduled transmission estimated on the basis of a transmission flow bitrate, by dividing the length of the frame or fragment of a flow, to transmit, by the current bitrate of that flow.

2. The method according to claim 1, wherein said normal frames and, if any, one or several fragments remaining from a previous normal frame processing, are queued in a memory and are assigned with respective processing instants and wherein a current time is compared with a least processing instant so as to implement said steps if the current time is greater than the least processing instant.

3. The method according to claim 1, wherein,
if said current normal frame cannot be fragmented, it is determined whether a remaining time to a next time window opening is enough to transmit the whole current normal frame, and:
if yes, said whole current normal frame is transmitted,
otherwise, a temporization step is applied until a next current time.

4. The method according to claim 2, wherein, if said current normal frame cannot be fragmented, it is determined whether a remaining time to a next time window opening is enough to transmit the whole current normal frame, and:
if yes, said whole current normal frame is transmitted,
otherwise, a temporization step is applied until a next current time.

5. The method according to claim 1, wherein, if said current normal frame can be fragmented, it is determined whether a remaining time to a next time window opening is enough to transmit at least one fragment, and:
if yes, at least one fragment is transmitted,
otherwise, a temporization step is applied until a next current time.

6. The method according to claim 2, wherein, if said current normal frame can be fragmented, it is determined whether a remaining time to a next time window opening is enough to transmit at least one fragment, and:
if yes, at least one fragment is transmitted,
otherwise, a temporization step is applied until a next current time.

7. The method according to claim 3, wherein, if said current normal frame can be fragmented, it is determined whether a remaining time to a next time window opening is enough to transmit at least one fragment, and:
if yes, at least one fragment is transmitted,
otherwise, a temporization step is applied until a next current time.

8. The method according to claim 4, wherein, if said current normal frame can be fragmented, it is determined whether a remaining time to a next time window opening is enough to transmit at least one fragment, and:
if yes, at least one fragment is transmitted,
otherwise, a temporization step is applied until a next current time.

9. The method according to claim 5, wherein, if the current normal frame can be fragmented, it is determined further whether the remaining time until the next window opening is enough to send a remaining part of a normal complete frame, and:
if yes, corresponding fragments of a remaining part of said normal complete frame are transmitted,
otherwise, one or several fragments, corresponding to a total duration less than the remaining time until the next window opening, are transmitted.

10. The method according to claim 1, wherein said remaining time until the next window opening is compared to a time taken for transmitting a fragment or a normal frame estimated on the basis of a capacity of a link on which said fragment or frame is transmitted.

11. The method according to claim 1, wherein a normal frame is considered as able to be fragmented if its total length is at least twice as a length of a minimum fragment size.

12. The method according to claim 11, wherein said total length of a normal frame is updated with its remaining fragments which have not been transmitted.

13. The method according to claim 1, wherein said time windows are successively defined in a cyclic timetable.

14. A device comprising:
a memory; and
a processor configured to perform a method for traffic shaping of data frames to transmit in a telecommunication network, the frames to transmit being distinguished between
express frames, needing to be sent within predetermined time windows, and normal frames, intended to be sent at times outside said time windows, wherein, for a current normal frame, the processor performs the steps of:
determining whether said normal frame can be fragmented, and if yes:
determining whether a remaining time to a next time window opening is enough to transmit one or several fragments of said normal frame, and if yes:
transmitting said one or several fragments,
and wherein:
several flows are being processed and each flow comprises successive normal frames and, if any, one or several fragments remaining from a previous normal frame processing,
said normal frames and/or fragments of each flow are queued in a memory and are assigned with respective processing instants,
a current time is compared with a least processing instant among all the queues of the respective flows so as to implement said steps if the current time is greater than said least processing instant,
said processing instants are updated at each scheduled transmission of a frame or a fragment, by the duration of said scheduled transmission estimated on the basis of a transmission flow bitrate, by dividing the length of the frame or fragment of a flow, to transmit, by the current bitrate of that flow.

15. A non-transitory computer readable medium having stored thereon instructions which when executed by a processor, causes the processor to perform a method for traffic shaping of data frames to transmit in a telecommunication network, the frames to transmit being distinguished between express frames, needing to be sent within predetermined time windows, and normal frames, intended to be sent at times outside said time windows, wherein, for a current normal frame, the processor performs the steps of:
determining whether said normal frame can be fragmented, and if yes:
determining whether a remaining time to a next time window opening is enough to transmit one or several fragments of said normal frame, and if yes:
transmitting said one or several fragments,
and wherein:
several flows are being processed and each flow comprises successive normal frames and, if any, one or several fragments remaining from a previous normal frame processing,
said normal frames and/or fragments of each flow are queued in a memory and are assigned with respective processing instants,
a current time is compared with a least processing instant among all the queues of the respective flows so as to implement said steps if the current time is greater than said least processing instant,
said processing instants are updated at each scheduled transmission of a frame or a fragment, by the duration of said scheduled transmission estimated on the basis of a transmission flow bitrate, by dividing the length of the frame or fragment of a flow, to transmit, by the current bitrate of that flow.

\* \* \* \* \*